United States Patent
El Gamal et al.

(10) Patent No.: US 12,200,014 B2
(45) Date of Patent: Jan. 14, 2025

(54) LIFELONG LEARNING BASED INTELLIGENT, DIVERSE, AGILE, AND ROBUST SYSTEM FOR NETWORK ATTACK DETECTION

(71) Applicant: Purdue Research Foundation, West Lafayette, IN (US)

(72) Inventors: Aly El Gamal, Lafayette, IN (US); Ali A. Elghariani, San Diego, CA (US); Arif Ghafoor, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 83 days.

(21) Appl. No.: 17/105,069

(22) Filed: Nov. 25, 2020

(65) Prior Publication Data

US 2021/0243226 A1    Aug. 5, 2021

Related U.S. Application Data

(60) Provisional application No. 62/969,600, filed on Feb. 3, 2020.

(51) Int. Cl.
  *H04L 9/40*    (2022.01)
  *G06N 3/04*    (2023.01)
  *G06N 3/088*   (2023.01)

(52) U.S. Cl.
  CPC .......... *H04L 63/1491* (2013.01); *G06N 3/04* (2013.01); *G06N 3/088* (2013.01); *H04L 63/1416* (2013.01)

(58) Field of Classification Search
  CPC ........ G06N 3/04; G06N 3/0454; G06N 3/088; G06N 5/04; H04L 63/1416; H04L 63/1491
  See application file for complete search history.

(56) References Cited

U.S. PATENT DOCUMENTS 8,682,812 B1 *  3/2014  Ranjan .................. H04L 43/028
                                                       706/12
10,104,100 B1  10/2018  Bogorad
                (Continued)

OTHER PUBLICATIONS

Othman, S. M. et al., "Intrusion detection model using machine learning algorithm on Big Data environment." Journal of Big Data 5, No. 1 (2018): 34.

(Continued)

*Primary Examiner* — Daniel B Potratz
*Assistant Examiner* — Matthias Habtegeorgis
(74) *Attorney, Agent, or Firm* — Purdue Research Foundation

(57) ABSTRACT

A lifelong learning intrusion detection system and methods are provided. The system may capture network data directed to a host node. The host node may include a honeypot. The honeypot may emulate operation of a physical or virtual device to attract malicious activity. The system may classify, based on a supervised machine learning model, the network data as being not malicious or not malicious. The system may classify, based on an unsupervised machine learning model, the network data as being anomalous or not anomalous. The system may alter operation of the honeypot to induce malicious activity. The system may determine, after operation of the honeypot is altered, the honeypot is accessed. The system may retrain the supervised machine learning model and/or unsupervised machine learning model based the network data.

20 Claims, 4 Drawing Sheets

(56) References Cited

U.S. PATENT DOCUMENTS

| | | | |
|---|---|---|---|
| 10,104,102 B1 | 10/2018 | Neumann | |
| 10,178,115 B2 | 1/2019 | Xie | |
| 10,182,065 B1 | 1/2019 | Ryon et al. | |
| 10,185,832 B2 | 1/2019 | Cam | |
| 10,187,411 B2 | 1/2019 | Obermeier et al. | |
| 10,187,413 B2 | 1/2019 | Vasseur et al. | |
| 2006/0242701 A1* | 10/2006 | Black | H04L 63/1491 726/22 |
| 2008/0018927 A1* | 1/2008 | Martin | G06F 21/74 358/1.15 |
| 2012/0167208 A1* | 6/2012 | Buford | H04M 7/006 726/22 |
| 2013/0242743 A1* | 9/2013 | Thomas | H04L 63/1491 370/236 |
| 2017/0104773 A1* | 4/2017 | Flacher | H04L 63/1458 |
| 2019/0207960 A1* | 7/2019 | Chu | G06F 18/22 |
| 2019/0243972 A1* | 8/2019 | Krylov | G06F 21/561 |
| 2020/0053123 A1* | 2/2020 | Pliskin | H04W 12/12 |
| 2020/0067935 A1* | 2/2020 | Carnes, III | H04L 63/101 |

OTHER PUBLICATIONS

Glass-Vanderlan, T. R. et al., "A Survey of Intrusion Detection Systems Leveraging Host Data." arXiv preprint arXiv:1805.06070 (2018).

Chalapathy, R. et al., "Anomaly detection using one-class neural networks." arXiv preprint arXiv:1802.06360 (2018).

Pathak, D. et al., "Curiosity-driven exploration by self-supervised prediction." Proceedings of the IEEE Conference on Computer Vision and Pattern Recognition Workshops. 2017.

Wagener, G., "Self-Adaptive Honeypots Coercing and Assessing Attacker Behaviour." PhD diss., Institut National Polytechnique de Lorraine-INPL, 2011.

\* cited by examiner

LIFELONG LEARNING BASED INTELLIGENT, DIVERSE, AGILE, AND ROBUST SYSTEM FOR NETWORK ATTACK DETECTION

CROSS REFERENCE TO RELATED APPLICATIONS

This application claims the benefit of U.S. Provisional Application No. 62/969,600 filed Feb. 3, 2020, the entirety of which is hereby incorporated by reference.

TECHNICAL FIELD

This disclosure relates to network security and, in particular, to machine learning and honey-pot based security.

BACKGROUND

Security of data networks is becoming a critical challenge with the increased reliance on such networks in day-to-day life. Several aspects important to securing networks are authentication, access control, secure offloading techniques, and attack detection. An Intrusion Detection System (IDS) may monitor and analyze network traffic to detect intrusions. There are three categories of IDS methods for detecting attacks; signature-based detection, anomaly-based detection, and hybrid-based detection. The Signature-based detection is designed to detect known attacks by using signatures of those attacks. It can be an effective method of detecting known attacks whose signatures/templates are preloaded in the IDS database. However, new types of attacks cannot be detected as their signatures are not present. Hence, it is imperative for Signature-based detection methods that the database of known attacks must be frequently updated in order to increase the probability of intrusion detection. In anomaly-based detection, user activities are compared against predefined profiles to detect abnormal behaviors that might correspond to intrusions. Anomaly-based detection may be effective against unknown attacks or zero-day attacks without requiring frequent updates to the system. However, these methods usually have high false positive rates. Hybrid-based detection is a combination of two or more methods of intrusion detection that belong to different categories, in order to overcome the disadvantages of using a single method and obtain the diverse advantages of multiple methods. Many IDS techniques adopt machine learning (ML) algorithms for intrusion detection to enhance the accuracy of attack detection. However, due to the limitation of traditional machine learning techniques, existing IDS approaches are limited in several aspects; the most important one is the lack of continuous learning which is critical to adjust the detection mechanism to a changing environment. Moreover, the learning process of the existing techniques only performs well when there is a large enough training data set.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of introductory example, a system may provide intrusion detection that is capable of detecting known and unknown network attacks. The system may classify malicious traffic based on a combination of supervised and unsupervised machine learning as well as curiosity-based learning. Supervised machine learning may provide automatic feature extraction and model-based attack identification using a supervised machine learning framework and a repository of attack signatures from known or previously identified attacks. An unsupervised machine learning framework may perform automatic feature extraction and data driven anomaly detection. A rule-based decision framework may perform decision making and refinement based on data provided by the supervised machine learning framework and the unsupervised machine learning framework. A honeypot may provide additional insights into the malicious nature the network data. The honeypot may execute curiosity-based learning to cause malicious sources to generate additional network data for further analysis of attacker behavior.

One example of a technical advancement achieved by the systems and methods described below may be that anomaly detection, misuse detection, and honeypot techniques may be integrated to detect a wide range of diverse attacks and learn how to best identify the already known attacks as well as recognize unknown/zero-day attacks and capture their behavior for future identification. The hybrid intrusion detection system architecture described herein may apply anomaly detection with an unsupervised machine learning model (such as a one-class machine learning model) and a supervised machine learning model with templates/signatures of known attacks to identify misuse. In addition, the architecture may include a honeypot that provides curiosity-based learning for analysis of previously unknown attack behavior. A rule-based learning component may provide a centralized decision authority with at least two roles: 1) making final decisions regarding the maliciousness of the incoming traffic based on the recommendations of the ML components, including optional analysis of the honeypot component, and 2) providing life-long/continuous updates to the ML components through feedback based on ongoing traffic classification and received recommendations. The robustness of the system and methods described herein is reinforced by lifelong learning updates, input pre-processing components that are designed to be resilient to adversarial attacks, and a cross-layer feature extraction mechanism for networks with a wireless communication medium.

Additional and alternative benefits, efficiencies, and improvements are made evident in the systems and methods described herein.

Figure 1:
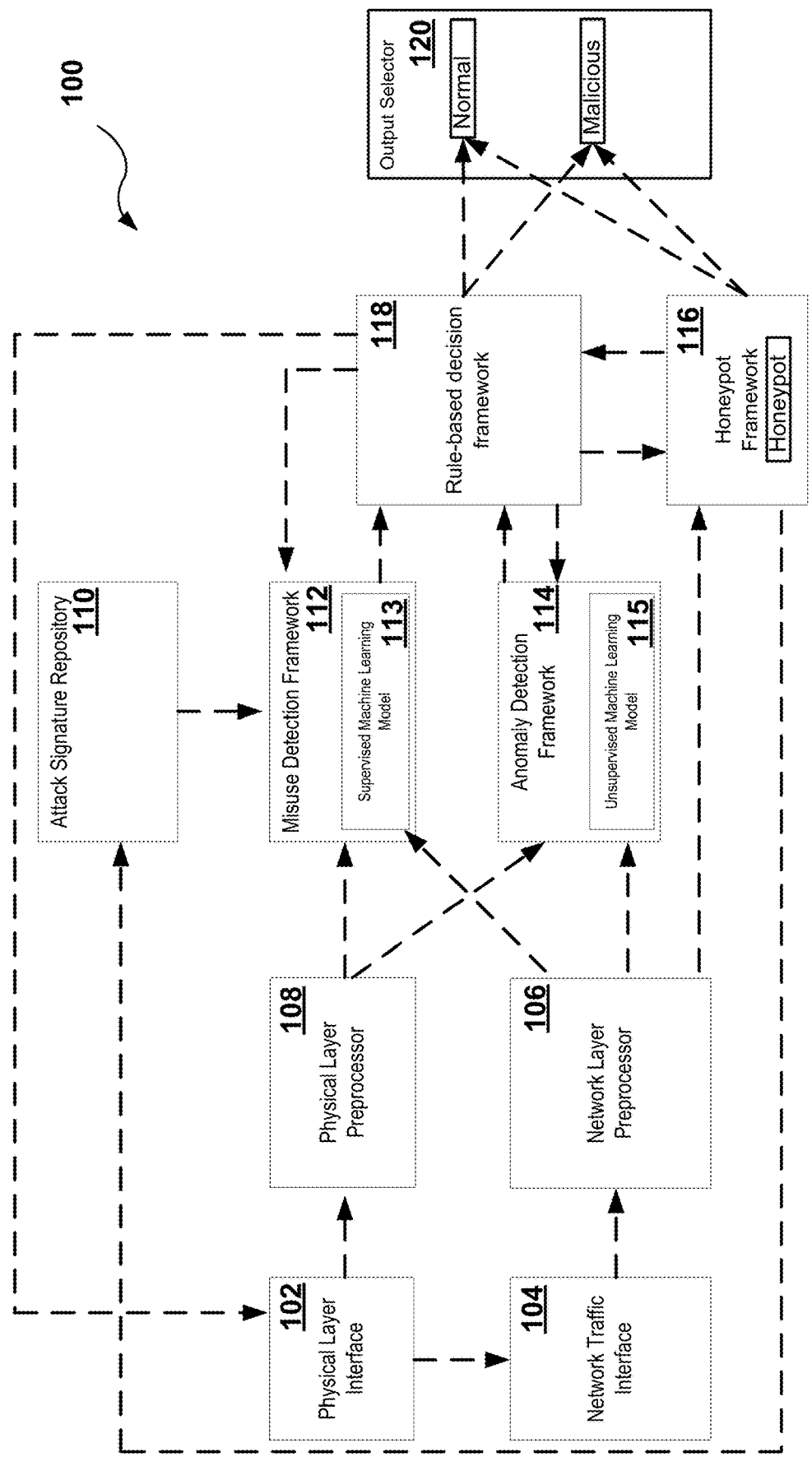
FIG. 1 illustrates a first example of a life-long learning intrusion detection system.

FIG. 1 illustrates a first example of a life-long learning intrusion detection system 100. (hereinafter referred to as the system 100). The system may include a physical layer interface 102 and/or a network traffic interface 104. The physical layer interface 102 may receive information sent wirelessly or wired over a network. In various examples, the physical layer interface 102 may include a physical or virtual network adapter or some other hardware or combination of hardware and software that receives network data either wirelessly or wired.

The network traffic interface 104 may receive information received by the physical layer interface 102. Alternatively, or in addition, the network traffic interface 104 may organize, parse, buffer, manage, and/or provide the data as part of a network stack. The network traffic interface 104 may be include, for example, networking services provided by an operating system and/or some other service, such as a network traffic sniffer.

It should be appreciated that the physical layer interface 102 and the network traffic interface 104 may be included in a same or separate networking hardware/software. For example, the physical layer interface 102 may include a network interface controller while the network traffic interface 104 may include a packet monitor. Alternatively, the physical layer interface 102 and/or network traffic interface 104 may be included in the same physical or virtual network interface controller. In other examples, the physical layer interface 102 and/or network traffic interface 104 may be provided by an operation system and/or software development kit.

The system 100 may include a network layer pre-processor 106. The network layer pre-processor 102 may process network traffic data and convert it into a format that is suitable for various machine learning techniques, such as supervised machine learning and/or unsupervised machine learning. In various examples, the network traffic data may include raw network packets. Alternatively, or in addition, the network traffic data may include packets, or portions of packets, such as data corresponding to one or more layers of the Open Systems Interconnection (OSI) model.

The network layer pre-processor 106 may extract various features from a data set for training and building the model. These features may include, for example, source IP address and its port number, destination IP address and its port number, date and time of transmission, and packet size. Alternatively, or in addition, numeric parameters may be normalized. Also, alphanumeric parameters in the data set may be enumerated and are normalized. The goal of data normalization is to reduce or eliminate components of input vectors that have an overwhelming influence on the training result. The network layer pre-processor 106 may also include logic to combat potential machine learning adversarial attacks, for example, through filtering (using for example a denoising autoencoder) and compression (using for example principal component analysis or a traditional autoencoder).

The system 100 may include a physical layer pre-processor 108. The physical layer pre-processor may process the physical layer data of a network to make it suitable for different machine learning techniques, such as supervised machine learning and/or unsupervised machine learning. This physical layer pre-processor 108 may also be equipped with algorithms to combat adversarial machine learning attacks. Collectively, both the physical layer pre-processor 108 and the network layer preprocessor 106 facilitate the training of the machine learning models based on the features extracted from both physical and network layers.

The system 100 may include an attack signature repository 110. The attack signature repository 110 may include a database comprising signatures of known attacks. As defined herein, an attack signature may include a packet, series of packets, and/or features derived from packet(s). Alternatively or in addition, an attack signature may include an association between features extracted from packets and labels identifying malicious or non-malicious activity. In some examples, the packet may further include labels identifying the source of the malicious activity, the resources historically accessed, and other information descriptive of the malicious activity or type of malicious activity. The attack signature repository 110 may be updated dynamically whenever a new attack is identified. The existing signatures can be improved continuously through the lifelong learning-based updates. Using the attack signature repository 110, decisions may be made on whether a newly discovered attack pattern results in a new signature or an update to an existing signature.

The system 100 may include a misuse detection framework 112. The misuse detection framework 112 may provide misuse detection for detecting pre-defined (known) attacks based on their available signatures. Misuse detection techniques involve the comparison of network traffic with the known behaviors of the attackers. This misuse detection framework 112 may utilize various supervised machine learning classification techniques to identify the misuse detection based on extracted features from network data. For example, the misuse detection framework may include, or access, a supervised machine learning model 113. The supervised machined learning model 113 may include a trainable model based on supervised machine learning approaches such as a multi-label deep neural network classifier. The supervised machine learning model may be customized to the type of network traffic as well as the features extracted from the physical layer of a wireless network.

The system may include an anomaly detection framework 114. The anomaly detection framework 114 may include an unsupervised machine learning model 115. For example, the unsupervised machine learning model 115 may include one-class deep neural networks for detecting anomalous behaviors based on the trained normal behavior model. The anomaly detection framework 114 may create and store profiles of normal behavior based on training with the corresponding normal traffic data. Normal traffic that represent normal behavior would be clustered around one class and any anomalous traffic representing abnormality and possibly suspicious behavior would be an outlier and lie outside the normal traffic cluster.

The system may include a honeypot framework 116 (also referred to herein as honeypot). The honeypot framework 116 may gather information about attackers' behavior, including their strategies, originating sites, information about the deployment of their malicious software including the locations of malicious code repositories. The honeypot framework 116 may mimic real production systems, (physical and/or virtual) in order to be attractive to attackers. In some examples, the honeypot 116 may be passive. The honeypot may employ appropriate mitigation techniques when interacting with real attackers. During this interaction, various levels of operation at risks are used, ranging from the emulation of services to the exposure of real services. The honeypot 116 may include curiosity-based learning logic in order to capture the behavior of the attacker and identify the type of the unknown attack. Curiosity-based learning logic includes an intrinsic reward mechanism to enable the honeypot 116 to explore and understand the environment. The curiosity-based learning logic may include operations that cause interactions with the attacker with the aim to learn the attacker's behavior, and learn information germane to detecting new types of attacks.

Alternatively or in addition, the curiosity learning logic may identify attacker's behavior corresponding to least prediction confidence. The curiosity learning logic may simulate triggering behavior through fake requests and/or responses that are not identifiable by the attacker. Confidence may be measured through, for example, assessing similarity between the SoftMax output units of a neural network classifier. Alternatively, the curiosity driven honeypot logic may include operations for stimulating target behavior such as issuing requests and/or responses that maximize the conditional probability of observing the target behavior. Each issued request and/or response should not reveal to the attacker the fact that it is currently interacting with a honeypot 116.

The system 100 may include a rule-based decision framework 118. The rule-based decision framework 118 may be the central authority governing identification of normal traffic versus malicious traffic. The rule-based decision framework 118 may interpret the results of both anomaly and misuse detection from the misuse detection framework 112 and the anomaly detection framework 114. Alternatively, or in addition, the rule-based decision framework 118 may report intrusion detection activity. In some examples, the rule-based decision framework 118 may engage in analysis of output provided by the honeypot framework 116. Alternatively or in addition, the rule-based decision making framework may provide lifelong learning-based updates to the misuse detection framework 112, the anomaly detection framework 114 and/or the honeypot framework 116 through feedback based on ongoing traffic classification and received recommendations.

The system may further include an output selector. The output selector may apply a criterion resulting in network traffic being labeled as normal or malicious. In some examples, the label may be associated with the network traffic. Alternatively, or in addition, the label may be added to the network traffic as part of, for example, a header. Thus, network traffic may stream through the system 100 where network data output by the system is labeled as either malicious or not malicious.

The system may include all or some of the components shown in FIG. 1. In some examples, the system may include the physical layer misuse detection framework 112, the anomaly detection framework 114, and the honeypot decision framework 116, with or without other components described herein depending on the technical advantages sought and the design specification to be satisfied.

Figure 2:
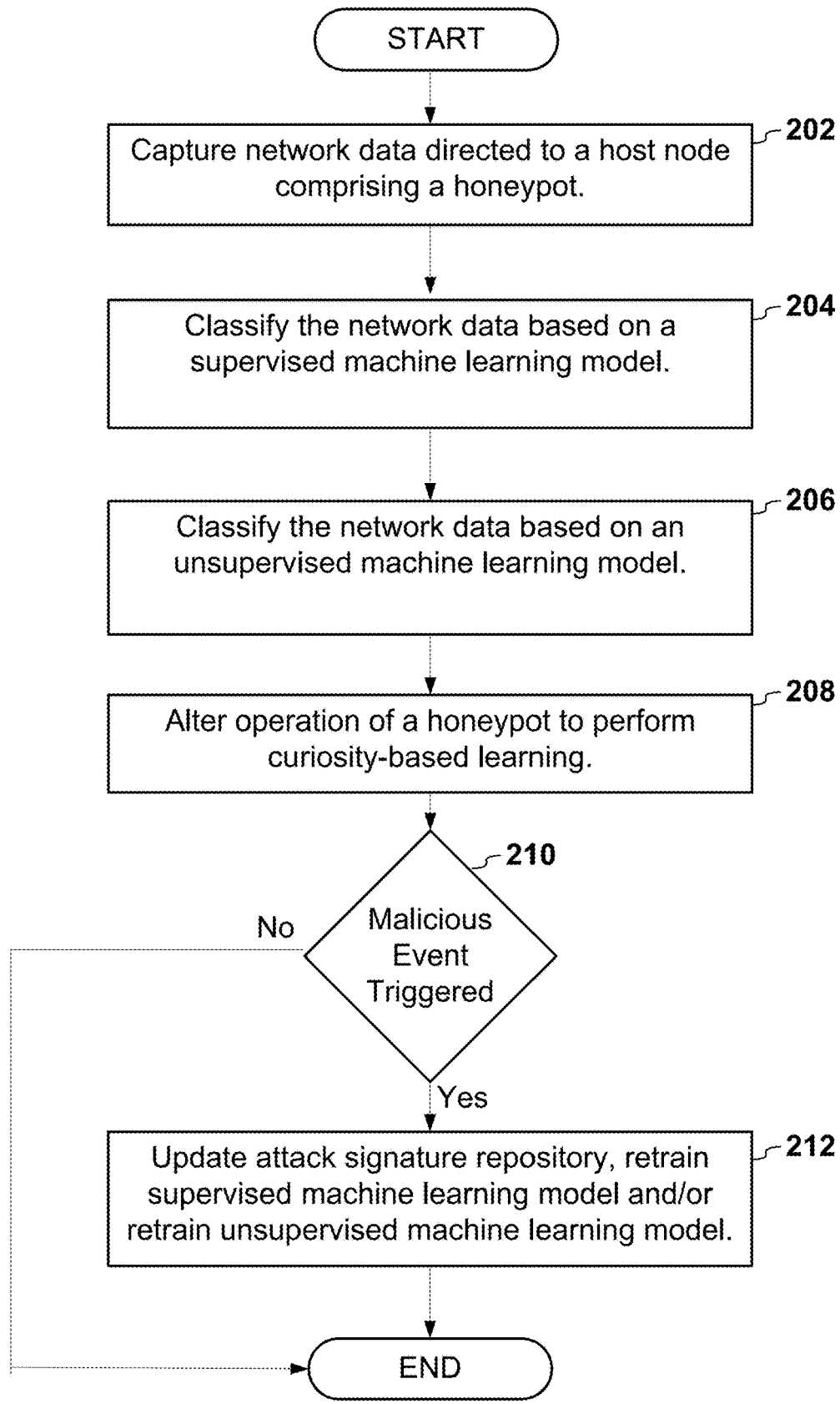
FIG. 2 illustrates an example of a flowchart for a system.

FIG. 2 illustrates an example of a flowchart for the system. The physical layer interface 102 and/or the network traffic interface 104 may receive network data directed to a host node (202). The host node may include a honeypot.

The physical layer preprocessor 108 may determine various physical layer features and the network layer preprocessor 106 may determine various network layer features. Physical layer features may include information descriptive of a physical layer of a network stack including, for example, magnitude and phase of received wireless signal samples. Network layer features may include information descriptive of a network stack such as, for example, IP header information. In either case, the physical layer preprocessor 108 and the network layer preprocessor 106 may prepare the features for machine learning models. For example, the physical layer preprocessor 108 and/or the network layer preprocessor 106 may generate a vector of features or some other data structure that can be used to generated predictions with a machine learning model.

The misuse detection framework may classify the network data based on a supervised machine learning model (204). For example, the misuse detection framework may classify the network data as being malicious, not malicious, and/or some other identification of attack type. Alternatively, or in addition, the misuse detection framework may access the supervised machine learning model. The supervised machine learning model may receive features from the network data as input. The supervised machine learning model may provide misuse confidence measurement(s). The misuse confidence measurement may be a measurement of network data being malicious or matching some previously identified attack signature. For example, the supervised machine learning model may have been trained with labeled groups of features stored in the attack signature repository 110.

The anomaly detection framework 114 may classify the network data based on an unsupervised machine learning model (206). For example, the anomaly detection framework 114 may identify anomalous features or series of features extracted from the network data. The anomaly detection framework 114 may provide feature(s) to an unsupervised machine learning model. The unsupervised machine learning model may provide a confidence measurement of the network data being normal or abnormal. In various examples, the unsupervised machine learning model may include a one-class deep neural network.

The honeypot framework 116 may alter operation of the honeypot (208). The honeypot may mimic a target service or node. For example, the honeypot may provide a set of resources, data, and/or procedural calls that replicate a production service or appear to provide a legitimate purpose. For example, the honeypot may make one or more file, memory location, database, and/or executable instruction available or exposed. In various examples, the honeypot may include a production honeypot, a research honeypot, a purse honeypot, a high-interaction honeypot, a low interaction honeypot, a decoy honeypot, a malware honeypot, a spider honeypot, or the like.

The honeypot may provide various features, which can be further used in for machine learning and decision modeling including, for example, the source of the malicious access, the level of the threat, the modulus operandi of the attacker, the resources of interest, the performance, and other descriptions of the attack, the attacker, and the resource accessed. Furthermore, operation of the honeypot may be altered to gather additional features or to make the honeypot more enticing to a would-be attacker. To alter operation of the honeypot, the honeypot framework may access a command associated with a reward metrics inversely proportional to a measure of confidence of how a source node will respond after execution of the command. Thus, higher rewards may be associated with lower confidences of attacker behavior.

When selecting a command to alter operation of the honeypot, the honeypot framework may select from many commands, each associated with a reward. The honeypot framework may select the command according to predetermined selection criteria. The predetermined selection criteria may include a criterion where the reward is greater than a threshold value. In other words, the honeypot framework may select commands that encourage new or unlearned behavior by a malicious user.

The system may determine whether the honeypot triggers a malicious event (210). For example, the honeypot may detect the unauthorized access to one or more resources and trigger the malicious event. Alternatively, the honeypot may compare network traffic, procedural, and resource access, and other features derived from the network traffic to malicious activity criteria. In response to satisfaction of the malicious activity criteria, the honeypot may trigger the malicious event.

In response to the malicious event (210, YES), the system may update the attack signature repository, retrain the supervised machine learning model 113 and/or update the unsupervised machine learning model 115 (212). To train the supervised machine learning model, the rule-based decision framework may store (or update an existing) attack signature in the attack signature repository 110. The attack signature may include one or more features of network data labeled as malicious. The attack signature may include additional or alternative information such as, for example, the type of malicious access or other information provided by the honeypot framework.

The system 100 may also retrain the unsupervised machine learning model 115. For example, network data, or associated features, may be identified as normal or not malicious by the honeypot framework 116. Such features may be used to update the unsupervised machine learning model. For example, the network data, or related features, may be added to historical network data, which is included in or accessed by the unsupervised machine learning model during operation.

Retraining the unsupervised machine learning model may involve updating the distribution of normal data and/or imposing new prior statistical assumptions about the inputs which the machine learning model should classify as anomalous. For example, the system may adjust parameters, weights and/or mathematical formula included in the unsupervised machine learning model, depending on the type of unsupervised machine learning to modify the accuracy of classifying the network data, or associated features as anomalous or normal.

Ultimately, the supervised machine learning model 113 and unsupervised machine learning model 115 may be accessed for production network traffic to identify malicious/anomalous network data. It should be appreciated that the honeypot framework 116 may operate concurrently along with a production environment whereby malicious activity directed to the honeypot is identified and models are updated to identify similar attacks against production resources.

Figure 3:
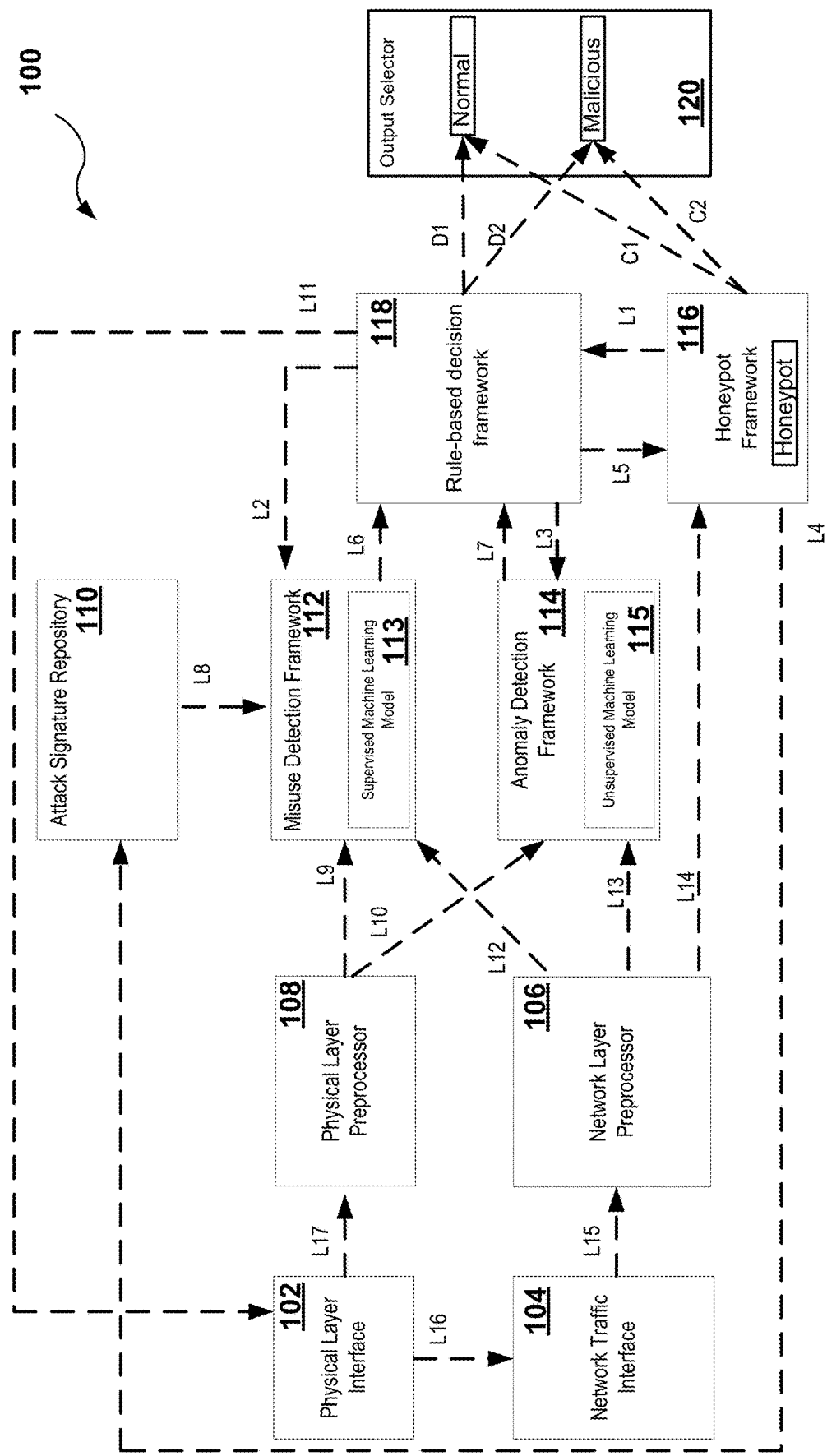
FIG. 3 illustrates an example of a system labeled with dataflows.

FIG. 3 illustrates a second example of the system 100 with labeled dataflows. The system may include various data flows. The dataflows shown in FIG. 1 and FIG. 3 are presented for ease of explanation of a possible example, though other data flows are possible.

Flow L1 includes feedback from the honeypot C to the rule-based decision framework D. Flows L2, L3, and L5 may transfer information generated under various scenarios. The curiosity-based learning framework may provide routine adjustment/training of the misuse detection framework 112, the unsupervised anomaly detection framework 114, and/or the honeypot framework 116 in an ongoing fashion to provide lifelong machine learning.

In case there is an attack on the misuse detection framework 112, the anomaly detection framework 114, and/or the honeypot framework 116, then rule-based framework 118 may activate the recovery of these components through flows L2, L3, and L5. For example, the rule-based machine learning framework 118 may attain information about the normal behavior of the misuse detection framework 112, the anomaly detection framework 114, and/or the honeypot framework 114. The rule-based decision framework may compare the historical information with tunable thresholds and logic that trigger a recovery response. The recovery response may include instructions for restarting or redeploying the faulty component. In this regard, the security architecture itself is resilient towards external attacks.

Rule-based decision framework 118 may demultiplex traffic into normal and malicious traffic streams based on the outputs of the misuse detection framework 112, the anomaly detection framework 114, and/or the honeypot framework 116. The demultiplexing mechanism can include a suitable rule-based learning strategy such as fuzzy association rules.

Information transmitted over flow L4 may include new or updated attack signatures that are stored for later access. For example, when a new attack signature is discovered the new attack signature may be stored in the attack signature repository 110.

Normal behavior may be captured by the anomaly detection framework 114 and may be refined as further tuning to existing normal behavior is required in response to information received from the honeypot via flows L1 and L3. On the other hand, new attacks discovered by the honeypot may be reported via flows L1 and L2 and new attack templates may be created and updated via flow L4.

In some circumstances, the honeypot framework 116 may be triggered to invoke further analysis of incoming traffic. The request for further analysis along with the subject network traffic and/or related features may be transmitted via flow L5. This case may arise when there is measured uncertainty as to whether the incoming traffic is normal or malicious. The uncertainty may be due to various reasons, including receiving low confidence recommendations from the misuse detection framework 112 and the anomaly detection framework 114 through flows L6 and L7, respectively. Note that the data transmitted via flows 6 and/or 7 may constitute a fuzzy truth table listing the confidence scores on whether the packet sequence under analysis corresponds to normal traffic or a known attack. Also, in case the honeypot framework 116 itself is under attack, the rule-based decision framework may recover/repair the honeypot via flow 5.

In various examples, life-long learning may include continuously improving classification by the mise-use detection framework 112, the anomaly detection framework 114, and the honeypot framework 116 through various feedback paths originated at the rule-based decision framework 118.

Flow L6 may include a control signal to the rule-based decision framework indicating whether the network traffic received by the misuse detection framework matches an existing attack template.

Flow L7 may include a control signal to the rule-based decision framework 118 about whether the network traffic investigated by the anomalous detection framework is anomalous.

Flow L8 may include communications from the supervised machine learning framework A to retrieve signatures of known attacks.

Flows L9 and L10 may include communications to pass preprocessed traffic from the physical layer preprocessor 108 to the misuse detection framework 112 and the anomaly detection framework 114.

Flow L11 may include communications where control signals from the rule-based decision framework 118 trigger updates and/or to change the physical layer communication protocol. Changing the physical layer communication channel may limit the possible attacks a potential adversary can introduce, and such attacks may have high confidence classification by the system. Thus, this approach may be applied when alteration of the incoming traffic pattern is needed to improve decision confidence.

Flows L12, L13, and L14 may include communications to forward preprocessed network traffic at the packet level to components representing the misuse detection framework 112, the anomaly detection framework 114, and/or the honeypot framework 16. In other examples, the network layer preprocessor 106 may also send the preprocessed network traffic to the rule-based decision framework 118.

Flow L15 may include communications to deliver incoming network traffic to the network layer preprocessor 106.

Flows L16 and L17 may include communications to deliver incoming wireless physical layer data to both the network layer preprocessor 106 and the physical layer preprocessor 108, respectively.

Flows c1, c2, d1 and d2 may include communications to demultiplex traffic by the honeypot 116 and the rule-based decision framework 118 into normal and malicious traffic.

Various examples describing how the system may respond to various types of network traffic are now described. Reference to FIG. 3 is made throughout the discussion of the following examples.

Example 1—Normal Network Traffic Based on High Confidence Classification

In this example, no malicious activity is present in network traffic received by the system. The preprocessed network data communicated via flows L12 and L13 is investigated with the misuse detection framework 112 and the anomaly detection framework 114, respectively. The generated output from flow L6 indicates that the traffic does not match any of the existing templates. Similarly, the generated output from flow L7 indicates that the traffic is not anomalous. Based on the output on flows L6 and L7, the rule-based decision framework 118 determines the traffic is normal. In response to determining the traffic is normal, a normal indication is sent via flow d1. In this scenario, feedback data may be provided via flows L2 and L3 to the misuse detection framework 112 and the anomaly detection framework 114, respectively. The feedback may affirm the decision implied by these components. Accordingly, the system may enable a flow of the normal traffic in response to the normal traffic indication. Further, the system exploits the exposure to normal traffic patterns for further training and fine tuning of its machine learning components and decision parameters.

Example 2—a Known Attack Based on High-Confidence Classification

The attack signature repository 110 may include an existing attack signature for detecting the incoming attack. The preprocessed traffic through flows L12 and L14 is investigated through the misuse detection framework 112 and the anomaly detection framework 114, respectively. The information from the control signal of flow L6 indicates that the traffic features match an existing attack template. Similarly, the information from the control signal of flow L7 indicates that the traffic is anomalous. Based on the results of flows L6 and L7, the rule-based decision framework 118 of the architecture determines that the traffic is malicious. Accordingly, flow d2 is activated and flow d1 is de-activated by the rule-based decision framework 118 to indicate malicious traffic. In this scenario, feedback is sent via flows L2 and L3 to the misuse detection framework 112 and the anomaly detection framework 114 to perform life-long learning (i.e. recalibration of the supervised machine learning model 113 and/or the unsupervised machine learning model 113). Accordingly, the system 100 uses exposure to known attack patterns for further training and fine tuning of the machine learning components and decision parameters.

Example 3—an Unknown Attack Based on High Confidence Classification

In the third example, network traffic contains an unknown attack (based on high confidence classification). In this example, the attack signature repository 110 does not have an existing template for the incoming attack. The preprocessed traffic through flows L12, L13, and L14 is investigated through the misuse detection framework 112, the anomaly detection framework 114, and the honeypot framework 116, respectively. The misuse detection framework 112, via flow L6, may indicate that the traffic does not match any of the existing templates. However, the anomaly detection framework, via flow L7, may indicate that the traffic is anomalous. In response, the rule base decision framework may communicate with the honeypot framework 116 through flow L5. Consequently, the honeypot framework 116 may perform analysis of the attack behavior and generates a template for the unknown attack. The honeypot framework may provide feedback to the rule-based decision framework about the newly generated template. The rule-based decision framework may send feedback via flows L2 and L3 for lifelong learning purposes. Furthermore, the honeypot framework may add the attack template to the attack signature repository 110 via flow L4. Note that instead of adding a new template, the honeypot framework 116 could decide to update an existing template to accommodate the new attack pattern.

Example 4—Conflicting or Low Confidence Decisions

This example demonstrates, among other capabilities, a lifelong learning scenario with conflicting or low confidence decisions. This example demonstrates the situation when information from flows 6 and 7 are in a conflict or carry low confidence measurements (i.e. Confidence measurements below corresponding threshold values). For instance, when flow L6 signifies that the traffic corresponds to a known attack may flow L7 signifies that the traffic is normal. In this case, the rule-based learning component 118, with malicious indications from the honeypot framework 116, determines whether the traffic is malicious and provides the result to the misuse detection framework 112 and/or the anomaly detection framework 114 to avoid such situation in the future. Thus, the system may classify the incoming traffic in future iterations. Further, the system uses exposure to this traffic pattern for lifelong learning by continuously tuning the machine learning components and known attacks templates database.

Example 5—Low Confidence Classification Results

Exemplified here is a wireless network scenario in which the misuse detection framework 112 and the anomaly detection framework 114 provide low confidence classification results. The rule-based decision framework 118 may request a change in the physical layer communication protocol (for example, increasing transmit power in the case of a wireless physical communication). The rule-based decision framework may communicate the command to change the protocol via flow L11. In this scenario, flows L5 and L1 could also be activated simultaneously along with flow 11. Accordingly, the system may make a recommendation to appropriately change the wireless physical layer communication protocol in order to avoid this very low confidence classification scenario in the future; classify the incoming traffic with the aid of the honeypot framework 116; and provide lifelong learning updates to the misuse detection framework 112 and/or the anomaly detection framework 114.

The logic and flows illustrated in the diagrams may include additional, different, or fewer operations than illustrated. The operations illustrated may be performed in an order different than illustrated. The system 100 may be implemented with additional, different, or fewer components than illustrated. Each component may include additional, different, or fewer components.

Alternatively or in addition, the system may relate to the following aspects. In a first aspect, the system may provide intrusion detection that is capable of detecting known and unknown network attacks. The system may classify malicious traffic based on a combination of supervised and unsupervised machine learning as well as curiosity-based learning honeypot techniques. The supervised machine learning may perform automatic feature extraction and model-based attack identification using the misuse detection framework 112 and the attack signature repository 110. The anomaly detection framework 114 may perform automatic feature extraction and data driven anomaly detection. Subsequently, the decision may be taken by the rule-based decision framework 118 based on the recommendations of the misuse detection framework 112 and the anomaly detection framework 114, in addition to potential feedback from the honeypot framework 116 that may use further analysis of attack behavior using curiosity-based learning.

In a second aspect, the ML components of the system may extract features of the incoming traffic.

In a third aspect, the known attacks templates smart database may be dynamically updated with newly learned attacks using analysis resulting from honeypot and rule-based learning components.

In a fourth aspect, new attacks reported by the honeypot may result in updates to the misuse-detection framework 112 through, for example, flows L1-:2, and the attack signature repository 110 through flow L4.

In a fifth aspect, the system may avoid uncertain or low confidence classification decisions on whether the incoming traffic is normal or malicious by performing further analysis using a curiosity-based learning honeypot component.

In a sixth aspect, the honeypot may provide a curiosity-based learning mechanism in order to generate a robust model for the attacker's behavior and identify the type of a potentially previously unknown attack.

In a seventh aspect, the system may resolve scenarios where the misuse-detection framework 112 and anomaly detection framework 114 have low confidence or conflicting decisions about the incoming traffic.

In an eight aspect, the system may rely on a rule-based learning component that acts as an authority for evaluating output provided by the misuse-detection framework 112, the anomaly detection framework 114, and the honeypot framework116.

In a nineth aspect, the system may provide lifelong learning updates to the machine learning components through feedback that is based on final traffic classification and received recommendations.

In a tenth aspect, the system may self-defend against adversarial attacks that target the employed ML techniques.

In an eleventh aspect, the robustness of the system may be ensured through lifelong learning updates, input pre-processing components that are designed to combat adversarial attacks, and cross-layer feature extraction.

In a twelfth aspect, the agility and processing speed of the system is ensured and improved through lifelong updates and honeypot analysis to discover new attacks and update existing attack templates.

In a thirteenth aspect, the diversity of the system with respect to attack types is ensured through cross-layer feature extraction and discovery of new attacks.

In a fourteenth aspect, the intelligence and distributed nature of the system may be present not only at the individual ML component level, but at the rule-based learning authority that dynamically architects the system to cope with different environmental conditions.

Figure 4:
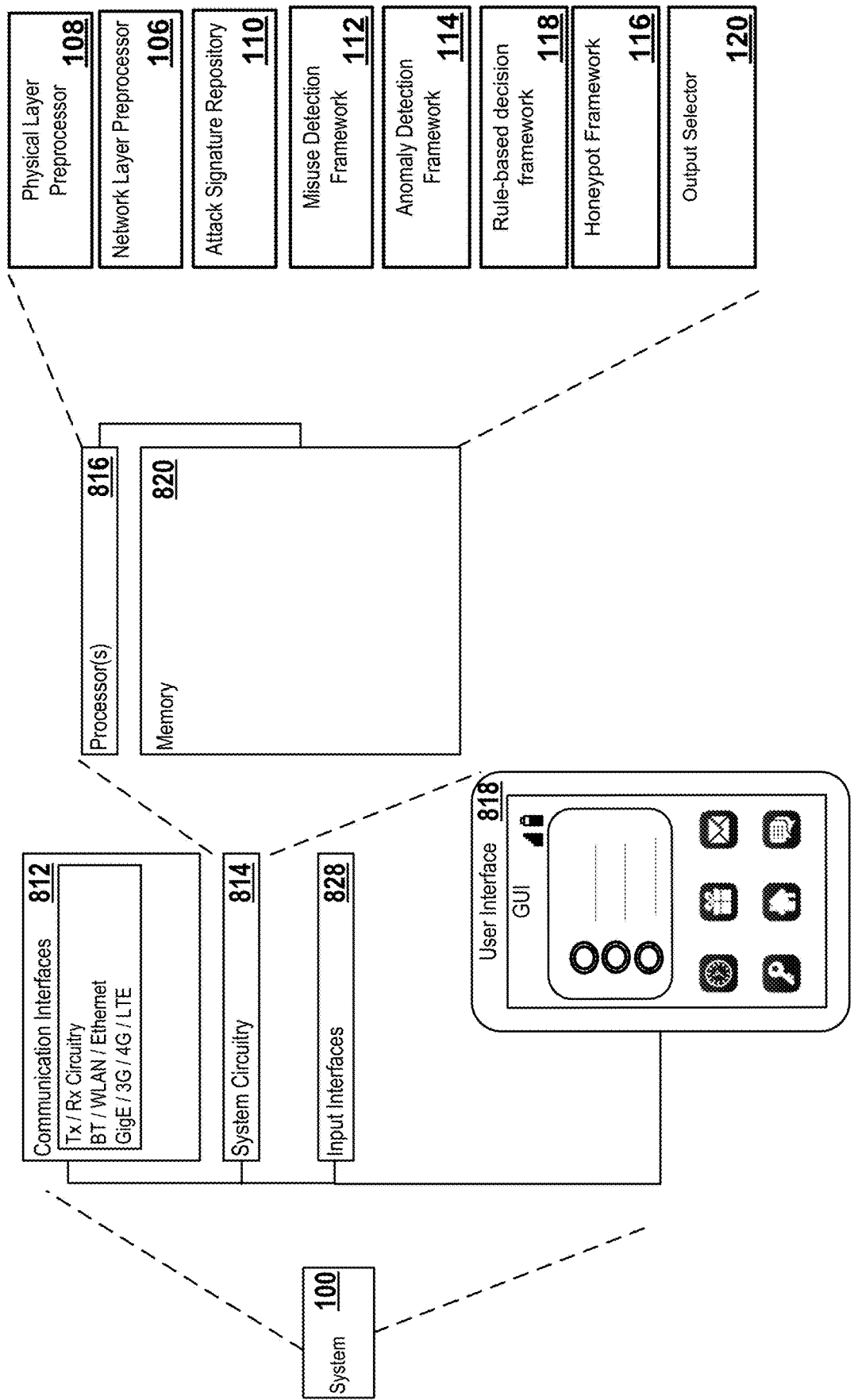
FIG. 4 illustrates a second example of a system.

FIG. 4 illustrates a second example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations of the network layer preprocessor 106, the physical layer preprocessor 108, the attack signature repository 110, the misuse detection framework 112, the anomaly detection framework 114, the rule-based decision framework 118, the honeypot framework 116, the output selector 120, the system 100, or any component or sub-component of the system. The computer code may include instructions executable with the processor 816.

The memory 820 may be any device for storing and retrieving data or any combination thereof. The memory 820 may include non-volatile and/or volatile memory, such as a random-access memory (RAM), a read-only memory (ROM), an erasable programmable read-only memory (EPROM), and/or flash memory. Alternatively or in addition, the memory 820 may include an optical, magnetic (hard drive), solid-state drive and/or any other form of data storage device. The memory 820 may include at least one of the network layer preprocessor 106, the physical layer preprocessor 108, the attack signature repository 110, the misuse detection framework 112, the anomaly detection framework 114, the rule-based decision framework 118, the honeypot framework 116, the output selector 120, and/or the system 100. Alternatively, or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many ways. In some examples, the system 100 may be implemented with one or more logical components. For example, the logical components of the system 100 may be hardware or a combination of hardware and software. The logical components may include the network layer preprocessor 106, the physical layer preprocessor 108, the attack signature repository 110, the misuse detection framework 112, the anomaly detection framework 114, the rule-based decision framework 118, the honeypot framework 116, the output selector 120, the system 100, and/or any other component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, and/or any other type of computer readable storage medium or storage media. The computer readable storage medium may include any type of non-transitory computer readable medium, such as a CD-ROM, a volatile memory, a non-volatile memory, ROM, RAM, and/or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, and/or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system comprising:
a processor, the processor configured to:
capture network data directed to a host node, the host node comprising a honeypot, the honeypot configured to emulate operation of a physical or virtual device to attract malicious activity;
classify, based on a supervised machine learning model, the network data as being one of malicious or not malicious;
classify, based on an unsupervised machine learning model, the network data as being one of anomalous or not anomalous;
alter operation of the honeypot in response to classifying the network data as not malicious based on the supervised machine learning model and in response to classifying the network data as anomalous based on the unsupervised machine learning model;
determine, after operation of the honeypot is altered, the honeypot is accessed; and
retrain, in response to altering operation of the honeypot and determining the honeypot is accessed, the supervised machine learning model and unsupervised machine learning model based on the network data.

2. The system of claim 1, wherein to alter operation of the honeypot the processor is further configured to:
select a predetermined instruction configured to cause the honeypot to alter operation; and
execute the predetermined instruction.

3. The system of claim 1, wherein the supervised machine learning model is trained based on a plurality of attack signatures stored in a repository.

4. The system of claim 3, wherein to retrain the supervised machine learning model, the processor is further configured to:
determine features based on the network data;
generate a new attack signature comprising the determined features; and
store the new attack signature in the repository.

5. The system of claim 1, wherein the processor is further configured to:
extract, from the network data, features from a physical layer portion of the network data and the network layer portion of the network data.

6. The system of claim 1, wherein the unsupervised machine learning model comprises a one-class deep neural network.

7. The system of claim 1, wherein to alter operation of the honeypot, the processor is further configured to:
identify a plurality of commands associated with respective reward metrics, the respective reward metrics inversely proportional to a measure of confidence to forecast a response from a source node after execution of the plurality of commands, respectively;
determine a reward metric associated with the command satisfies a predetermined selection criterion; and
select a command from the plurality of commands in response to satisfaction of the predetermined selection criterion.

8. The system of claim 7, wherein satisfaction of the predetermined selection criteria comprises the reward metric being greater than a threshold reward value or the reward metric being ranked highest among the respective reward metrics.

9. A method, comprising
capturing network data directed to a host node, the host node comprising a honeypot, the honeypot configured to emulate operation of a physical or virtual device to attract malicious activity;
classifying, based on a supervised machine learning model, the network data as being malicious or not malicious; and
classifying, based on an unsupervised machine learning model, the network data as being anomalous or not anomalous;
after classifying the network data with both the supervised and unsupervised machine learning model:
altering operation of the honeypot in response to the network data being classified as anomalous and not malicious;
determining, after operation of the honeypot is altered, the honeypot is accessed; and
retraining, in response to the honeypot being accessed, at least one of the supervised machine learning model and unsupervised machine learning model with features from the network data.

10. The method of claim 9, wherein altering operation of the honeypot the further comprises:
selecting a predetermined instruction configured to cause honeypot to alter operation; and
executing the predetermined command.

11. The method of claim 9, wherein the supervised machine learning model is trained based on a plurality of attack signatures stored in a repository.

12. The method of claim 9, retraining the supervised machine learning model comprises:
determining features based on the network data; generating a new attack signature comprising the determined features; and storing the new attack signature in the repository.

13. The method of claim 9, further comprising:
extracting, from the network data, features from a physical layer portion of the network data and the network layer portion of the network data.

14. The method of claim 9, wherein the unsupervised machine learning model comprises a one-class deep neural network.

15. The method of claim 9, wherein to alter operation of the honeypot, the processor is further configured to:
identifying a plurality of commands associated with respective reward metrics, the respective reward metrics inversely proportional to a measure of confidence of receiving a subsequent response from a remote user after the honeypot is altered;
determining a reward metric associated with the command satisfies a predetermined selection criterion; and
selecting a command from the plurality of commands in response to satisfaction of the predetermined selection criterion.

16. The method of claim 15, wherein satisfaction of the predetermined selection criteria comprises the reward metric being greater than a threshold reward value or the reward metric being ranked highest among the respective reward metrics.

17. A non-transitory computer readable storage medium comprising:
a plurality of instructions executable by a processor, the instructions comprising:
instructions executable by the processor to capture network data directed to a host node, the host node comprising a honeypot, the honeypot configured to emulate operation of a physical or virtual device to attract malicious activity; and
instructions executable by the processor to classify, based on a supervised machine learning model, the network data as being malicious or not malicious;
instructions executable by the processor to classify, based on an unsupervised machine learning model, the network data as being anomalous or not anomalous;
instructions executable by the processor to enhance the supervised machine learning model and unsupervised machine learning model, the instructions comprising:
instructions executable by the processor to alter operation of the honeypot after the network data is classified as anomalous and not malicious;
instructions executable by the processor to determine, after operation of the honeypot is altered, the honeypot is accessed; and
instructions executable by the processor to retrain the supervised machine learning model and the unsupervised machine learning model with features from the network data in response to the honeypot being accessed.

18. The non-transitory computer readable storage medium of claim 17, wherein the instructions to alter operation of the honeypot further comprise:
instructions executable by the processor to identify a plurality of commands associated with respective reward metrics, the respective reward metrics inversely proportional to a measure of confidence of receiving a subsequent response from a remote user after the honeypot is altered;
instructions executable by the processor to determine a reward metric associated with the command satisfies a predetermined selection criterion; and
selecting a command from the plurality of commands in response to satisfaction of the predetermined selection criterion.

19. The non-transitory computer readable storage medium of claim 18, wherein satisfaction of the predetermined selection criteria comprises the reward metric being greater than a threshold reward value or the reward metric being ranked highest among the respective reward metrics.

20. The non-transitory computer readable storage medium of claim 17, the instructions executable by the processor to retrain the supervised machine learning model further comprise:
instructions executable by the processor to determine features based on the network data;
instructions executable by the processor to generate a new attack signature comprising the determined features; and
instructions executable by the processor to store the new attack signature in the repository.

* * * * *